Figure 1:
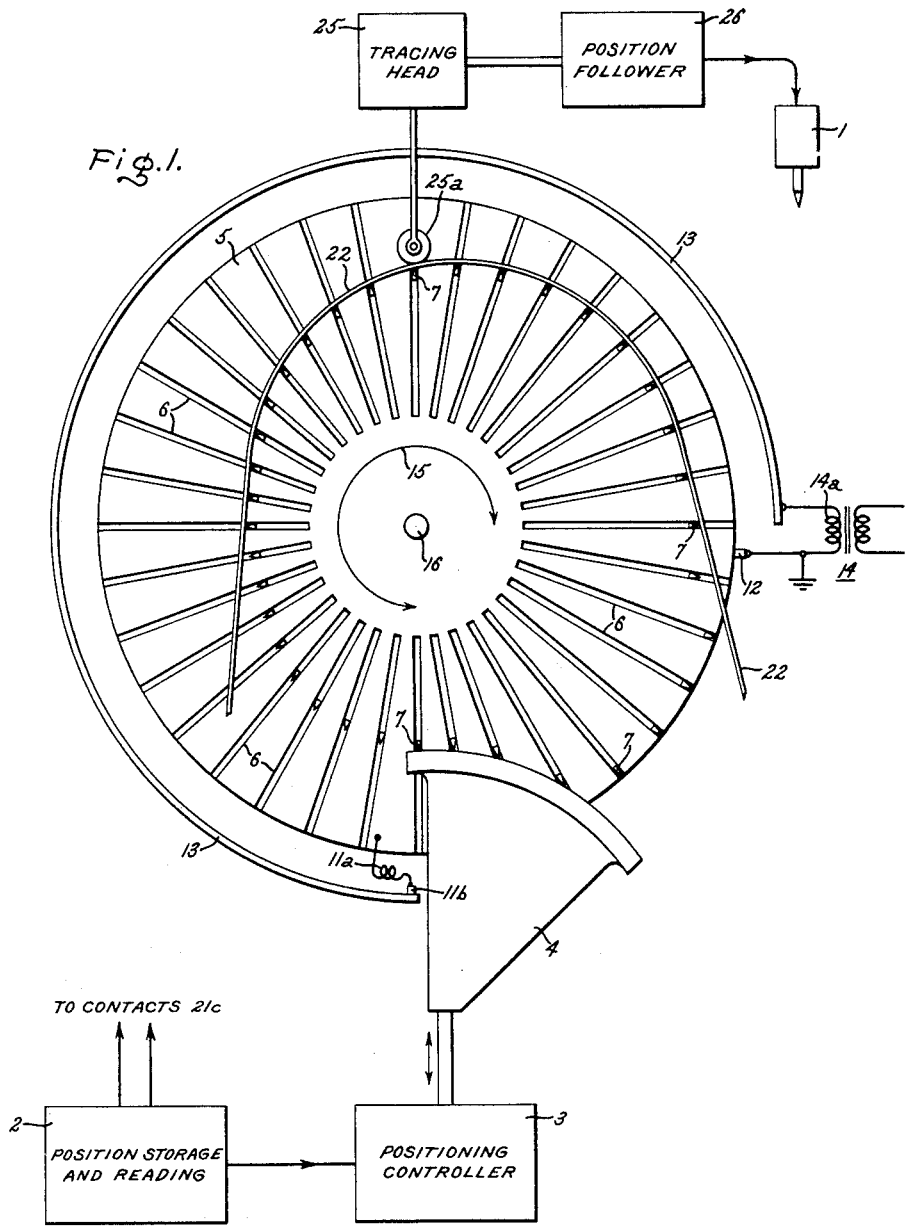

July 26, 1960     O. W. LIVINGSTON     2,946,993

AUTOMATIC PROGRAMMING CONTROL SYSTEM

Filed Sept. 21, 1956     2 Sheets-Sheet 1

Inventor:
Orrin W. Livingston,
by J. Wesley Naubrer
His Attorney.

July 26, 1960  O. W. LIVINGSTON  2,946,993
AUTOMATIC PROGRAMMING CONTROL SYSTEM
Filed Sept. 21, 1956  2 Sheets-Sheet 2
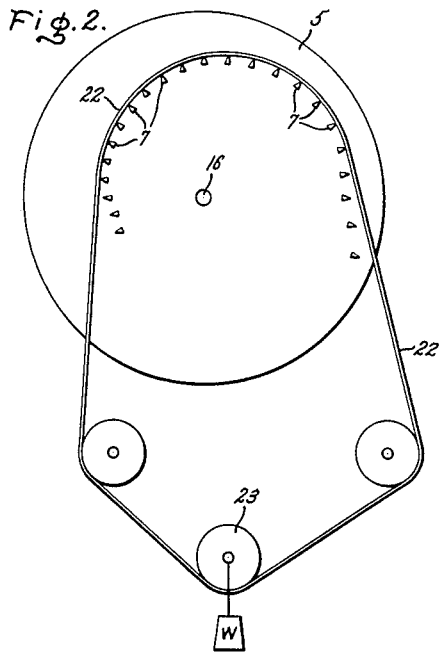
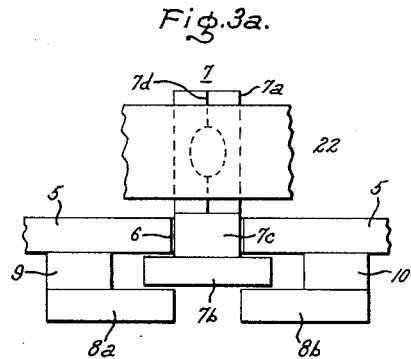
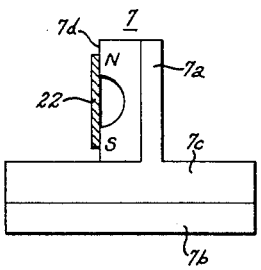
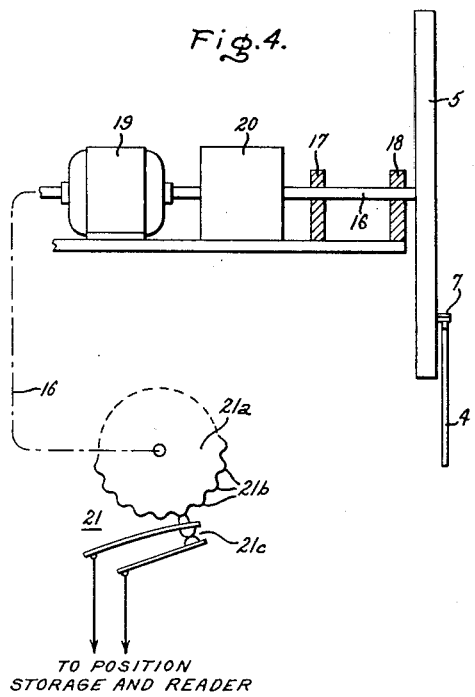
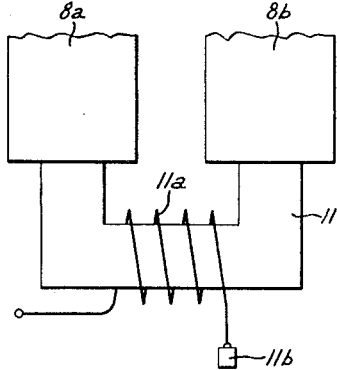
Inventor:
Orrin W. Livingston,
by J. Wesley Naulner
His Attorney.

United States Patent Office 2,946,993
Patented July 26, 1960

2,946,993

AUTOMATIC PROGRAMMING CONTROL SYSTEM

Orrin W. Livingston, Waynesboro, Va., assignor to General Electric Company, a corporation of New York Filed Sept. 21, 1956, Ser. No. 611,329

15 Claims. (Cl. 340—347)

This invention relates to control systems, more particularly to automatic programming control systems, and it has for an object the provision of a simple, reliable and improved control system of this character.

In certain applications of automatic programming control systems, the defining data for the program may be readily prepared only in the form of intermittent or discontinuous intelligence such as coordinates of discrete data points. For example, in cutting a desired profile in metal, the most economical method of preparing the defining data of the profile may be to specify the coordinates of a number of discrete data points along the periphery of a section. However, the finished profile must be smooth and continuous, and accordingly a further object of this invention is the provision of means for generating continuous data from original intelligence in the form of discrete data points. This implies a process of interpolation between coordinates of discrete data points, and accordingly a still further object of this invention is the provision of an automatic programming control system in which simple and improved means are provided for producing a continuous profile providing continuous interpolation between the coordinates of discrete data points.

In carrying the invention into effect in one form thereof, a carriage member movable along a predetermined path and having a plurality of equally spaced apart coordinates is provided together with a plurality of position heads mounted thereon. Each of the heads is mounted for movement along a corresponding coordinate. Means are provided for positioning and securing the positioning heads at points on their associated coordinates corresponding to the coordinate values of successive discrete data points during the progress of the heads past a predetermined point in their path, and a flexible member is mounted to be engaged and positioned by the succession of positioning heads simultaneously within a predetermined zone to produce a profile providing a continuous interpolation between the successive discrete data points represented by the positions of the heads on their coordinates.

For a better and more complete understanding of the invention, reference should now be had to the following specification and to the accompanying drawings of which Fig. 1 is a simple diagrammatic sketch of an embodiment of the invention, Fig. 2 is a simple diagrammatic sketch of a detail for effecting contact of the flexible member with the positioning heads, Figs. 3a, 3b and 3c are simple diagrammatic sketches of one of the positioning heads and associated electromagnetic means for clamping it to the carriage, and Fig. 4 is a diagrammatical sketch of a driving means for the positioning head carriage and associated control for actuating and coordinating operation of different parts of the entire system in timed relationship with each other.

Referring now to the drawing, the position of a controlled element 1 is to be continuously programmed in accordance with intelligence stored in a suitable data storage medium in the form of intermittent or discontinuous coordinate information of discrete data points. The controlled element may be a machine tool such as a milling machine and it may be assumed that the machine tool is required to cut a workpiece of metal to a smooth and continuous profile which is defined by intelligence stored in the data storage medium in the form of digital information of coordinates of discrete points of the profile.

In order to facilitate an understanding of the invention and its operation, it is assumed that the intelligence of the discrete data points is stored in polar coordinate form on a data storage medium such as punched tabulating cards or a punched tape. If punched cards are employed as the data storage medium (which is also assumed) the coordinate value of the radius vector for each successive coordinate value of the polar angle is preferably tabulated on a separate card.

Digital coordinate data of the discrete data points of the desired profile are converted into analog positional information, e.g. total rotation of a shaft by means of a digital-to-analog converter which is illustrated conventionally as comprising an intermittent data reader and position storage device 2. The coordinate information stored in the storage device following the reading of a punched card is utilized to control an intermittent position controller 3 to move a positioning arm 4 vertically (as shown in the drawing) to positions corresponding to the digital polar coordinate data on the cards. Although the intermittent data reader and position storage device 2 and positioning controller 3 may be of any suitable type, they are preferably of the type disclosed and claimed in application S.N. 478,632, Leroy U. C. Kelling, Automatic Programming Control System filed December 30, 1954, and assigned to the assignee of the present invention now Patent No. 2,848,670, issued August 19, 1958. Since the structural details per se of these devices constitute no part of the present invention, they are illustrated conventionally in the drawing.

Mounted for rotation in proximity to the positioning arm 4 is a movable carriage 5 which has an endless or closed path of travel and which has a plurality of equally spaced apart coordinates. Although this carriage may have any suitable form, it is illustrated as comprising a wheel which is mounted for rotation in a plane which is generally parallel to the plane in which the positioned arm 4 moves. As shown in Figs. 1 and 4, the positioning arm extends beyond the periphery of the wheel. The wheel has a plurality of equally spaced apart radial or polar coordinates which are disposed at equal angles to the path of travel, i.e. to the periphery; as shown they are perpendicular to the path of travel. The wheel is illustrated as having 36 such polar coordinates, each separated from its neighbors by angles of 10 degrees, and as shown in Figs. 1 and 3a it is provided with a corresponding number of radial slots 6. Each of the radial polar coordinates constitutes the centerline of one of these radial slots. It is not essential that the wheel have 36 slots; it could have a larger or smaller number.

Slidably mounted for radial movement in each of the slots of the wheel 5 as is most clearly shown in Figs. 1 and 3a is a head 7 which is moved in the slot by the positioning arm 4 to a polar radial position corresponding to the polar coordinates of the discrete data point read from the intermittent data storage medium by the reader. These heads are referred to as "memory heads," and the wheel upon which they are mounted is referred to as the "memory wheel," because each head is retained in the position to which it is moved for a predetermined portion of the revolution of the wheel.

Each of these memory heads comprises three parts, i.e. a magnetic portion 7a which is preferably made of a permanent magnetic material, a magnetic clamping block 7b made of a ferro-magnetic material such as iron or cold rolled steel, and an insert 7c which is preferably made of a suitable non-magnetic material such as brass. The permanent magnetic head portion 7a is ground to form a knife edge 7d which is cut away as shown in Figs. 3 and 4 to impart to it a horseshoe form with salient north and south poles. The memory heads are mounted in their corresponding slots with all permanent magnetic portions on one face of the memory wheel, the clamping bars on the other, and the non-magnetic inserts in the slots 6.

Disposed on the same side of the memory wheel with the clamping heads 7b are a plurality of pairs of clamping rails, one pair for each clamping head, which are made of a ferro-magnetic material such as steel or iron. The rails 8a and 8b of each pair are radially disposed on either side of the centerline of the corresponding slot and are separated from the base of the wheel by means of spacers 9 and 10 to provide a guide or slide way for the clamping head. The spacers 9 and 10 are made of a suitable non-magnetic material. Operatively associated in bridging relationship with each pair of such slide rails 8a and 8b is an electromagnet 11 having an exciting winding 11a which is excited at a predetermined point in the rotation of the memory wheel. These electromagnets are preferably mounted at the end of the associated guide-way nearest the periphery of the wheel.

For the purpose of energizing the exciting windings when the electromagnets are within a predetermined portion of the rotation of the memory wheel, the wheel is provided at some convenient point preferably, at or near its periphery with a conducting brush 12 and with a stationary slip ring 13 which are supplied from a suitable source of voltage such as the secondary winding 14a of a supply transformer 14. In Fig. 1 the exciting winding 11a of only one of the electromagnets is shown. One of its terminals is grounded on the body of the wheel and the other is connected to a conducting brush 11b which is carried by the wheel and slides on the stationary slip ring 13. It is to be noted that the slip ring 13 is not a complete ring, i.e. it does not extend throughout 360 degrees. As shown in Fig. 1 it extends through an angle of approximately 270 degrees, and thus each electromagnet is excited only when within a predetermined portion of its circular travel, i.e., within the polar angle defined by the extent of the stationary slip ring as illustrated by the arrow 15. When each electromagnet is excited, its magnetic flux takes a path through the ferro-magnetic clamping rails and clamping bar of the slider and thus clamps the memory head to the rails.

As shown in Fig. 4, the memory wheel 5 is mounted on a shaft 16 which is journaled for rotation in suitable bearings 17 and 18. The memory wheel is driven at a desired speed which is preferably substantially constant by suitable driving means such as the adjustable speed electric motor 19 to the drive shaft of which the shaft 16 of the memory wheel is connected through a gear box 20 which contains suitable speed-reducing gearing. Although the motor 19 may be of any suitable type, it is preferably a shunt-wound D.-C. motor with provision for weakening its field excitation to adjust its speed. It could also be a shunt wound D.-C. motor supplied from a suitable source of adjustable voltage such as adjustable voltage generator.

For the purpose of actuating the intermittent data reader and position storage device 2 in timed relationship with rotation of the memory wheel, a contact or cam switch 21 is provided. It comprises a cam wheel 21a which is provided with a plurality of cam surfaces 21b and a pair of contacts 21c which are mounted in co-operative relationship with the cam wheel so as to be closed and opened in response to the passage of each of the cam surfaces.

For the purpose of producing a smooth continuous profile through the successive discrete coordinate data points represented by the positions of the memory heads, a flexible member 22 is provided. Preferably, this flexible member is in the form of an endless steel tape which passes over and engages the knife edges of the projecting magnetic head portions of the succession of position memory heads within a predetermined zone. A predetermined value of tension is maintained in this type by any suitable tensioning means such as the weight W which is fastened to a pulley 23 which in turn is suspended in a loop of the tape. Since the steel tape is ferro-magnetic, it is attracted to and held in firm contact with the permanent magnetic portion of each of the memory heads which successively engage it within the predetermined zone. As a result, the tape is positioned in the desired locus and produces a smooth profile through all coordinate points represented by the memory heads with which it is in contact at any instant and consequently provides a smooth continuous interpolation between such points. For the purpose of continuously positioning the control element 1 to reproduce the profile defined by the flexible tape, a tracer control system comprising a tracer head 25 having a tracing stylus 25a in contact with the tape and a position follower 26 controlled by the tracing head is provided. Preferably the tracer head is designed to produce very little pressure on the tape so as not to distort the curve. For this purpose, a spark-type tracer head such as disclosed in U.S. Patents 2,677,310 and 2,677,311—Paul J. Campbell, may be used. However, such spark-type tracer head is not essential to this invention. The tracer control system itself may be of any suitable type. For example, it may be of the type disclosed in U.S. Patent 1,998,939—Mittag. While it is entirely possible to make the position follower large enough to position the appropriate motion of the controlled element 1 (assumed to be an element of a machine tool) as in the Mittag patent, it is sometimes desirable to cause the position follower to drive an electrical positioning device such as a selsyn which in turn may be utilized as the director of a larger follow-up control system for driving the appropriate motion of the controlled element.

The controlled element 1 could be either a movable table or the movable cutting tool of a machine tool. For purposes of explanation of the operation of the invention, it will be assumed that the machine tool is a rotary table milling machine with the table electrically or mechanically coupled to the memory wheel 5 for rotation therewith and having the radial position of the cutting tool controlled by the tracing head 25 and position follower 26.

With the foregoing understanding of the elements and their organization, the operation of the invention will readily be understood from the following detailed description. The motor 19 is assumed to be energized and driving in a clockwise direction and at constant speed the memory wheel 5 and the rotary table of a milling machine. The coordinate data of a discrete data point obtained from the last punched card read by the card reader and storage device 2 causes the positioning controller 3 to move the positioning arm 4 to a position in which its memory head engaging surface is displaced from the center of the memory wheel by an amount corresponding to the coordinate value of the radius vector of such data point. In moving to the desired position, the positioning arm also moves all the memory heads which are resting on it. Just before the extreme left hand memory head is moved off the supporting surface of the positioning arm by the rotation of the memory wheel, the brush 11b of the electromagnet associated with such memory head engages stationary slip ring 13 to complete an energizing circuit for its exciting winding 11a. This results in electromagnetically clamping such departing memory head in a radial position in its slot in the memory wheel corresponding to the coordinate data obtained from the last card read in the reader. Contact is maintained between the stationary slip ring 13 and the brush 14 for a predetermined portion of 1 revolution of the memory wheel, e.g. 270 degrees, so that the memory head, after being positioned and clamped, maintains its position for approximately 270 degrees during which it will be used to assist in generating the continuous position program, i.e. the desired profile.

As soon as the departing memory head 7 is clamped and clears the left end of the positioning arm, a cam surface on the cam switch closes contacts 21c to initiate the card reader and positioning control so that the positioning arm 4 positions the new extreme left-hand memory head in a radial position corresponding to the coordinate data of the next successive discrete data point of the program, and the head is clamped in the same manner as the first. Thus the cycle is repeated at regular intervals as the memory wheel rotates causing a series of positioned and clamped memory heads to move clockwise from the positioning arm. As the memory wheel rotates, the clamped memory heads engage the flexible steel tape and definitely set its position to produce a smooth, continuous profile passing through coordinates of the discrete data points read from the punched card. The tape firmly engages each of a succession of such heads which at any instant are within the predetermined zone of contact, and thus the tape furnishes a smooth interpolation between the data points represented by the position of the memory heads within such zone.

As a memory head moves out of the 270 degree polar angle at the extreme clockwise end of the stationary slip ring 13, another memory head is entering this polar angle at its extreme counterclockwise boundary. Consequently, the succession of memory heads within the zone of contact of the flexible tape with the memory heads and the coordinates of the profile defined thereby is continuously changing in accordance with the progress of the program. As each memory head departs from the 270 degree polar angle, its electromagnet is deenergized, attraction between the head and the tape is overcome by the divergence of the path of the head from the line of the tape, and the head slides inactively to the end of its slot to be repositioned in accordance with coordinate data of another discrete data point as it rides up on the memory head supporting surface of the positioning arm 4.

The tracer element of the tracer head follows the continuously changing profile produced by the tape, and the continuous position follow-up control system 26 causes the cutter 1 to reproduce such changing profile and thus to cut the workpiece to have a smooth, continuous profile which contains all the coordinates which were stored on the punched cards in the form of discontinuous intelligence of discrete data points.

The complete continuous program may be recorded on a suitable data storage medium such as a magnetic tape by means of a record playback control system such as disclosed in Patent 2,537,770—Livingston et al. For this recording operation a selsyn or another type of position indicating device connected to the memory wheel would be utilized to produce a continuous signal of one of the controlled motions, and a selsyn or other type of position indicating device connected to the position follower would be utilized to produce the continuous signal for the other controlled motion. The complete continuous program may then be played back from such recording at any future time and either at a faster or slower speed if desired.

Although in accordance with the provisions of the patent statutes, this invention is described as embodied in concrete form, and its principle has been described together with the best mode in which it is now contemplated carrying that principle into effect, it will be understood that the apparatus shown and described is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. In a programming control system, a carriage member movable along a predetermined path and having a plurality of equally spaced apart coordinates disposed at equal angles to said path, a plurality of positioning heads each mounted on said carriage for movement along a corresponding one of said coordinates, means for positioning and securing said heads on said carriage at points on their associated coordinates corresponding to the magnitude of successive discrete data points during the progress of said heads past a point on said path, and a flexible member mounted to be engaged and positioned by the succession of said heads within a predetermined zone to provide a continuous interpolation between the discrete data points represented by the positions of said heads on their corresponding coordinates.

2. In a programming control system, a carriage member movable along a predetermined path and having a plurality of equally spaced apart coordinates disposed at equal angles to said path, a plurality of positioning heads each mounted on said carriage for movement along a corresponding one of said coordinates, means for positioning and securing in succession each of said heads at a point on its associated coordinate corresponding to one of a plurality of successive discrete coordinate data points during the progress of said carriage past a predetermined point on said path, and a flexible member mounted to be engaged and positioned by a continuously changing succession of said heads in a predetermined zone of said path to provide a continuous interpolation between the discrete data points represented by the positions on said coordinates of said heads within said zone.

3. In a programming control system, a carriage member movable in a predetermined closed path and having a plurality of equally spaced coordinates disposed at equal angles to said path, a plurality of positioning heads each mounted on said carriage for movement therewith in said path and for movement along a corresponding one of said coordinates, a flexible member mounted to be engaged and positioned by said heads in a predetermined portion of said path, and means for positioning and securing in succession each of said heads at a point on its associated coordinate corresponding to one of a plurality of successive discrete data points during its progress past a point preceding the entrance boundary of a predetermined zone to provide within said zone a continuously changing succession of heads to position said flexible member to provide a continuous interpolation between the data points represented by the positions of the heads within said zone.

4. In a programming control system, a wheel mounted for rotation in a closed path about its central axis and having a plurality of equally spaced apart radii, a plurality of positioning heads each mounted on said wheel for rotation therewith and for movement along a corresponding one of said radii, means for positioning and securing said heads on said wheel at points on their associated radii corresponding to the magnitudes of successive discrete data points during the progress of said heads past a point on said path, and a flexible member positioned in proximity to said path throughout a predetermined portion thereof, and mounted to be engaged and positioned by the succession of heads within a predetermined zone to provide a continuous interpolation between the discrete data points represented by the positions of said heads on their corresponding radii.

5. In a programming control system, a wheel mounted for rotation about its central axis and having a plurality of equally spaced apart radial slots, a plurality of memory positioning heads each movably mounted in a corresponding one of said slots, means for positioning and securing said heads in their associated slots at points corresponding to the magnitudes of successive discrete data points during the progress of said heads past a predetermined point in their path of travel, a flexible member mounted to be engaged by the succession of said heads within a predetermined zone to produce a continuous profile providing a continuous interpolation between the discrete data points represented by the positions of said heads in said slots.

6. In a programming control system, a carriage member movable along a predetermined path and having a plurality of equally spaced apart coordinates disposed at equal angles to said path, a plurality of permanent magnet positioning heads each mounted on said carriage for movement along a corresponding one of said coordinates, means for positioning and securing said heads on said carriage at points on their associated coordinates corresponding to the magnitude of successive discrete data points during the progress of said heads past a point on said path, and a flexible tape member of magnetic material mounted to be engaged and positioned by the succession of said permanent magnet heads within a predetermined zone to produce a continuous profile providing a continuous interpolation between the discrete data points represented by the positions of said heads on their corresponding coordinates.

7. In a programming control system, a wheel mounted for rotation about its central axis and having a plurality of equally spaced apart radial slots, a plurality of permanent magnet positioning heads each movably mounted in a corresponding one of said slots, means for positioning and securing said heads in their associated slots at points corresponding to the magnitude of successive discrete data points during the progress of said heads past a predetermined fixed point, and a flexible tape member of magnetic material mounted to be engaged and positioned by the succession of said permanent magnetic heads within a predetermined zone to produce a continuous profile providing a continuous interpolation between discrete data points represented by the positions of said heads in said slots.

8. In a programming control system, a wheel mounted for rotation about its central axis and having a plurality of equally spaced apart radial slots, a plurality of positioning heads each movably mounted in a corresponding one of said slots, means for moving said heads in their associated slots to positions corresponding to the magnitudes of successive discrete data points during the progress of said heads past a predetermined point, electromagnetic means for clamping said heads in said positions, and a flexible tape member mounted to be engaged and positioned by the succession of said heads within a predetermined zone to produce a continuous profile providing a continuous interpolation between discrete data points represented by the positions of said heads in said slots.

9. In a programming control system, a wheel of nonmagnetic material mounted for rotation about its central axis and having a plurality of equally spaced apart radial slots each provided with a pair of magnetic clamping rails on one face of said wheel, a plurality of permanent magnet positioning heads each movably mounted in a corresponding one of said slots and each having a clamping slider of magnetic material cooperating with said clamping rails, means for successively moving said heads in their slots to positions corresponding to the magnitudes of successive discrete data points during the progress of said heads past a predetermined point, electromagnetic means for magnetizing said clamping rails to clamp said heads in said positions for a predetermined portion of the circular path of travel of said heads beginning at said predetermined point, and a flexible tape member of magnetic material mounted to be engaged and positioned by the succession of heads within a predetermined zone to produce a continuous profile providing a continuous interpolation between the data points represented by said positions of said heads.

10. A programming control system comprising a carriage member movable along a predetermined path and having a plurality of equally spaced apart coordinates disposed at equal angles to said path, a plurality of positioning heads each mounted on said carriage for movement along a corresponding one of said coordinates, means for positioning said heads on said carriage at points on their associated coordinates corresponding to the magnitudes of successive discrete data points comprising a movable member for engaging each of said heads at a predetermined point in its path of travel, and a digital-to-analog converter for converting coordinate data of said discrete data points into positions of said movable member, a flexible member mounted to be engaged and positioned by the succession of said heads within a predetermined zone to produce a continuous profile providing continuous interpolation between the coordinates of said discrete data points, and a tracer control system controlled by said profile.

11. A programming control system comprising a carriage member movable along a predetermined path and having a plurality of equally spaced apart coordinates disposed at equal angles to said path, a plurality of positioning heads each mounted on said carriage for movment along a respective one of said coordinates, and means for positioning said heads on said carriage at predetermined points on their respective coordinates comprising a second movable member for positioning each of said heads at a predetermined point in its path of travel, and a positioning controller for positioning said second member in response to digital signals applied to said controller.

12. A programming control system comprising a wheel mounted for rotation in a closed path about its central axis and having a plurality of equally spaced apart radii, means for driving said wheel at substantially constant speed, a plurality of positioning heads each mounted on said wheel for rotation therewith and for movement along a corresponding one of said radii, means for positioning said heads in succession on said wheel at points on their associated radii corresponding to the magnitudes of successive discrete data points comprising a movable member for engaging each of said heads at a predetermined point in its circular path of travel and a digital-to-analog converter having an intermittent data storage medium reading device actuated in timed relationship to the movement of said wheel, and a position controller controlled thereby for converting coordinate data of said discrete data points into positions of said movable member, a flexible member mounted to be engaged and positioned by the succession of said heads within a predetermined zone to produce a continuous profile providing a continuous interpolation between the coordinates of said discrete data points, and a continuous tracer control system controlled by said profile.

13. In a programming control system, a wheel mounted for rotation about its central axis and having a plurality of equally spaced apart radial slots, means for driving said wheel at a substantially constant speed, a plurality of positioning heads each movably mounted in a corresponding one of said slots, means for successively positioning said heads in their associated slots at points corresponding to the polar coordinates of successive discrete data points comprising a movable member for engaging and moving each of said heads at a predetermined point in its circular path of travel and a digital-to-analog converter having an intermittent data storage medium reading device actuated in timed relationship to the movement of said wheel, and a position controller controlled thereby for converting coordinate data of said discrete data points into positions of said movable member, a flexible member mounted to be engaged and positioned by the succession of said heads within a predetermined zone to produce a continuous profile providing a continuous interpolation between the coordinates of said discrete data points and a continuous tracer control system controlled by said profile.

14. A programming control system comprising in combination a wheel mounted for rotation about the control axis and having a plurality of equally spaced apart radial slots, means for rotating said wheel at substantially constant speed, a plurality of permanent magnet positioning heads each movably mounted in a corresponding one of said slots, means for successively positioning said heads in their associated slots at points corresponding to the polar coordinates of successive discrete data points comprising a movable member for engaging and moving each of said heads at a predetermined point in its circular path of travel, and a digital-to-analog converter having an intermittent data storage medium reading device actuated in timed relationship to the rotation of said wheel and a position controller controlled thereby for converting coordinate data of said discrete data points into positions of said movable member, a flexible tape of magnetic material mounted to be engaged and positioned by the succession of said magnetic heads within a predetermined zone to produce a continuous profile providing a continuous interpolation between the coordinates of said discrete data points, and a continuous tracer control system controlled by said profile.

15. In a programming control system, a wheel mounted for rotation about its central axis and having a plurality of equally spaced apart radial slots, each provided with a pair of magnetic clamping rails on one face of said wheel, a plurality of permanent magnet positioning heads each movably mounted in a corresponding one of said slots and each having a clamping slider of magnetic material cooperating with said clamping rails, a movable positioning arm for successively moving said heads in their slots to positions corresponding to the polar coordinates of successive discrete data points during the progress of said heads past a predetermined point, means for magnetizing said clamping rails to clamp said heads in said positions for a predetermined portion of the circular path of travel of said heads beginning at said predetermined point comprising a plurality of electromagnets each operatively associated with a corresponding pair of said clamping rails, and means for energizing each of said electromagnets at said predetermined point after positioning of its corresponding positioning head and for deenergizing each of said electromagnets and its corresponding head leaves said predetermined portion of said path, and an endless flexible tape of magnetic material mounted to be engaged and positioned by the succession of heads simultaneously within a predetermined zone to produce a continuous profile providing a continuous interpolation between the coordinates of said discrete data point.

References Cited in the file of this patent
UNITED STATES PATENTS 2,628,539     De Neergard _____ Feb. 17, 1953